(12) United States Patent
Rhelimi (10) Patent No.: US 8,477,668 B2
(45) Date of Patent: Jul. 2, 2013

(54) HIGH SPEED DATA TRANSMISSION METHOD AND CORRESPONDING DEVICES

(75) Inventor: Alain Rhelimi, Meudon (FR)

(73) Assignee: Gemalto SA, Meudon (FR)

( * ) Notice: Subject to any disclaimer, the term of this patent is extended or adjusted under 35 U.S.C. 154(b) by 298 days.

(21) Appl. No.: 12/996,085

(22) PCT Filed: Jun. 8, 2009

(86) PCT No.: PCT/EP2009/057040
§ 371 (c)(1),
(2), (4) Date: Dec. 3, 2010

(87) PCT Pub. No.: WO2009/150128
PCT Pub. Date: Dec. 17, 2009

(65) Prior Publication Data
US 2011/0103275 A1    May 5, 2011

(30) Foreign Application Priority Data
Jun. 11, 2008    (EP) .................................... 08290541

(51) Int. Cl.
*H04L 5/16* (2006.01)

(52) U.S. Cl.
USPC ........................... 370/296; 375/219; 375/220

(58) Field of Classification Search
USPC ........................... 370/276–296; 375/219–220
See application file for complete search history.

(56) References Cited

U.S. PATENT DOCUMENTS
6,463,092 B1 * 10/2002 Kim et al. ...................... 375/219
2008/0221707 A1 * 9/2008 Saitou et al. ...................... 700/3

FOREIGN PATENT DOCUMENTS
WO    WO2006/043130 A    4/2006

OTHER PUBLICATIONS

Gerald Madlmayr, et al. "The benefit of using SIM application toolkit in the context of near field communication applications" Management of Mobile Business, 2007. ICMB 2007. International Conferece on the, IEEE, PI, Jul. 1, 2007, pp. 5-5, XP031119380, ISBN: 978-0-7695-2803-8 the whole document.
PCT/EP2009/057040 International Search Report, Jul. 21, 2009. European Patent Office, P.B. 5818 Patentlaan 2 NL—2280 HV Rijswijk.
PCT/EP2009/057040 Written Opinion of the International Searching Authority, Jul. 21, 2009. European Patent Office, Gitschiner Str. 103 D-10958 Berlin.

* cited by examiner

*Primary Examiner* — Charles C Jiang
(74) *Attorney, Agent, or Firm* — The Jansson Firm; Pehr B. Jansson (57) ABSTRACT

This invention relates to a method for the transmission using the half-duplex mode of a data signal from a first transmission/reception device to a second transmission/reception device, called the remote device, comprising a logical coding step in which at least two distinct transmission times are associated with two respective statuses of the data signal to transmit. The method is characterized in that it comprises the generation by the first device of a signal (10, 11) comprising, for the transmission of a status of the signal, more or less exclusively a plateau at a first voltage level for the time defined as the transmission time associated with the status to transmit and a falling edge, to the exclusion of any rising edge, the transmission of a data signal status from the second device to the first device comprising the generation of a signal (20, 21) by the second device comprising more or less exclusively a plateau at a second voltage level and a rising edge, to the exclusion of any falling edge.

3 Claims, 7 Drawing Sheets

HIGH SPEED DATA TRANSMISSION METHOD AND CORRESPONDING DEVICES

BACKGROUND

This invention relates to a high speed data transmission method and the corresponding transmission/reception devices. More specifically, the invention describes a technical solution for digital transmission between two devices in bidirectional and simultaneous manner (full duplex) using only one active wire. The invention makes it possible to achieve high transmission speeds (several dozens of Mbits/sec) with a distance between the devices of up to one meter with comfortable immunity to noise.

The technology described according to the invention may be used in combination with the Recommendation TS102.613 of ETSI (European Telecommunication Standardization Institute) relating to SWP (Single Wire Protocol) and may as an example only be activated after a SIM card and an NFC controller discover their ability to operate in this more efficient mode allowed by the invention. Even though the invention may thus be used in SWP SIM cards, it may also be used advantageously in all environments that require the implementation of digital transmission between two devices in a bidirectional and simultaneous manner (full duplex) using only one active wire, such as for example in the case where the number of contacts available for the components is limited.

Many modulation techniques are in existence for sharing a medium of transmission between two transmission/reception devices, the main ones of which are:

Time-division multiplexing. The two transmission/reception devices transmit in half duplex mode and send their respective data at different times. The granularity of the data sent may vary from the size of a bit to the size of a byte or even a frame. Ethernet, USB, CAN, VAN, LIN or GSM networks use this principle.

Frequency-division multiplexing. Each transmission/reception device occupies a different frequency band. The technology of modems such as those used for ADSL networks use this principle.

Domain division. Each transmission/reception device modulates different physical quantities. The standard TS102.613 (SWP) applies this method, where one of the transmission/reception devices modulates the voltage of a signal whilst the other device modulates the current of a signal.

Sharing by summation. The medium transports the sum of the information transmitted by the transmission/reception devices. The transmission/reception devices deduct the received information by subtracting their transmitted data from the data transmitted through the medium. That function is carried out by a duplexer and is commonly used in conventional telephony systems.

All these technologies can use a single active communication wire (single ended) or work on a differential pair to increase their immunity to noise in difficult environments (e.g. manufacturing workshops, automobiles etc.)

Half-duplex transmission of data through a communication medium with excessively high granularity can generate high latencies that can harm performance. The effective bandwidth is directly affected by the transmission latency. In order to cancel that side effect, the use of full-duplex technology in combination with an appropriate protocol such as those based on sliding windows, the best known representative of which is HDLC (ISO 13239), is desired.

The issue addressed by this invention is the following:

The solution must have the characteristics of full-duplex communication with interchange granularity of a bit in order to achieve minimum latency, The solution must be symmetrical and balanced, that is to say that neither of the transmission/reception devices is more privileged than the other (no master or slave), The solution must make it possible to provide a power saving mode when no application data are transmitted between the two transmission/reception devices, The solution must supply a procedure enabling one or both of the transmission/reception devices to exit the power saving mode in minimum time, and The solution must allow an operational distance of at least a meter and a binary speed of up to 100 Mbits/s in a noisy environment.

The existing technologies described above partly meet the criteria set out above and the closest technology is that of SWP standardised by ETSI with the exception of the transmission speed and operating distance performance. SWP technology can reach 1.6 Mbits/s over a distance of about twenty centimeters.

The invention is aimed at meeting all those technical constraints. To that end, a method for the transmission using the half-duplex mode of a data signal from a first transmission/reception device to a second transmission/reception device, called the remote device, comprising a logical coding step during which at least two distinct transmission times are associated with two respective statuses of the data signal to transmit, is characterised in that it comprises the generation by the first device of a signal including, for the transmission of the signal status, more or less exclusively a plateau at a first voltage level for the time defined by the transmission time associated with the status to transmit and a falling edge, to the exclusion of any rising edge, the transmission of a data signal status from the second device to the first one comprising the generation of a signal by the second device comprising more or less exclusively a plateau at a second voltage level and a rising edge, to the exclusion of any falling edge. The signal status may be a binary status, "1" or "0" or a sequence of bits, e.g. "101".

The invention uses this "new type of multiplexing" to achieve a full-duplex protocol with granularity of a bit. That gives the invention all the characteristics set out in the issue to be addressed.

The method used by the invention to alternate the transmission of data between the two transmission/reception devices may be translated into "logical level multiplexing".

BRIEF DESCRIPTION OF THE DRAWINGS

Other characteristics and benefits of this invention will become clearer in the description below in relation with the corresponding attached drawings in which.

DETAILED DESCRIPTION OF THE INVENTION

Figure 1:
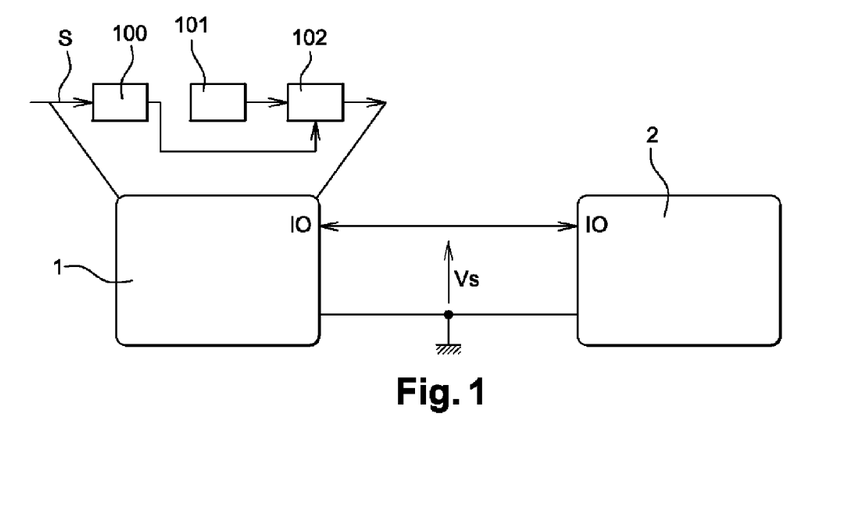
FIG. 1 is a schematic illustration of two transmission/reception devices according to the invention.

By reference to FIG. 1, data signals are transmitted in half duplex between two transmission/reception devices 1 and 2 according to the invention. The signal to transmit is a binary stream of bits or statuses. The transmission uses two levels of voltage corresponding with a high voltage of X volts (e.g. 5 Volts) and a low voltage of Y volts (e.g. 0 Volt).

According to the invention, logical coding is applied preliminarily, which coding uses for example the PWM technique (Pulse Width Modulation). The result of that preliminary coding process using pulse width modulation is that at least two distinct transmission times (T, 2T) are associated with two respective statuses ("0", "1") of the data signal to transmit.

Also according to the invention, in the system made up of the two transmission/reception devices 1 and 2 and the binary coding described above, the logical level 1 is allocated to one of the transmission/reception devices, for example 1, and the logical level 0 is allocated to the other transmission/reception device, 2 in this case.

Figure 2:
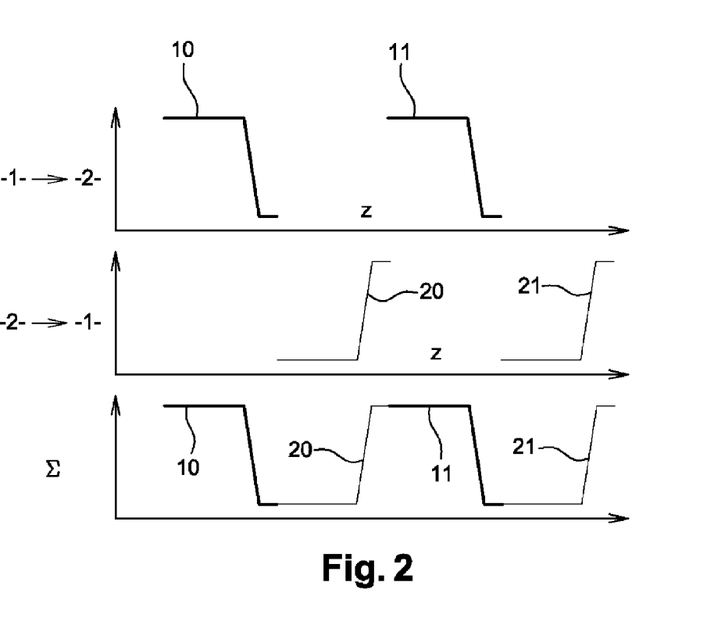
FIG. 2 is an illustration of multiplexing according to the invention of levels between the two transmission/reception devices.

In that way, according to the invention and as shown in FIG. 2, the transmission/reception device 1 transmits its signal 10, 11 in the form of a plateau on level 1, a falling edge of the signal and possibly (resulting from the "triggering" delay), a very small part of the level "0", and switches its output to high impedance in case of non transmission. The transmission/reception device 2 transmits its signal 20, 21 in the form of a plateau on level "0", a rising edge of the signal and possibly a very small part of the level "1" and then switches its output to high impedance. The signal represented on the third line of FIG. 2 is the result Σ of the sum of the two signals transmitted by the two devices 1 and 2, shown in the first and second lines of that figure respectively.

As shown in FIG. 1, a transmission/reception device according to the invention schematically includes a cascaded logical coding circuit 100 for associating at least two distinct transmission times with at least two respective statuses of a data signal to transmit, a circuit 101 for detecting the falling edge (or rising edge) generated by a remote transmission/reception device, a circuit 102, the input of which is connected to the output of the circuit 100, to generate, in response to the detection of the falling edge (or rising edge) generated by a remote transmission/reception device, a data signal status to transmit, more or less exclusively a plateau on a first level (or a second level) of voltage for more or less the time defined by the transmission time (T, 2 T) associated with the status ("0", "1") to transmit and a rising edge (or a falling edge).

Figure 3:
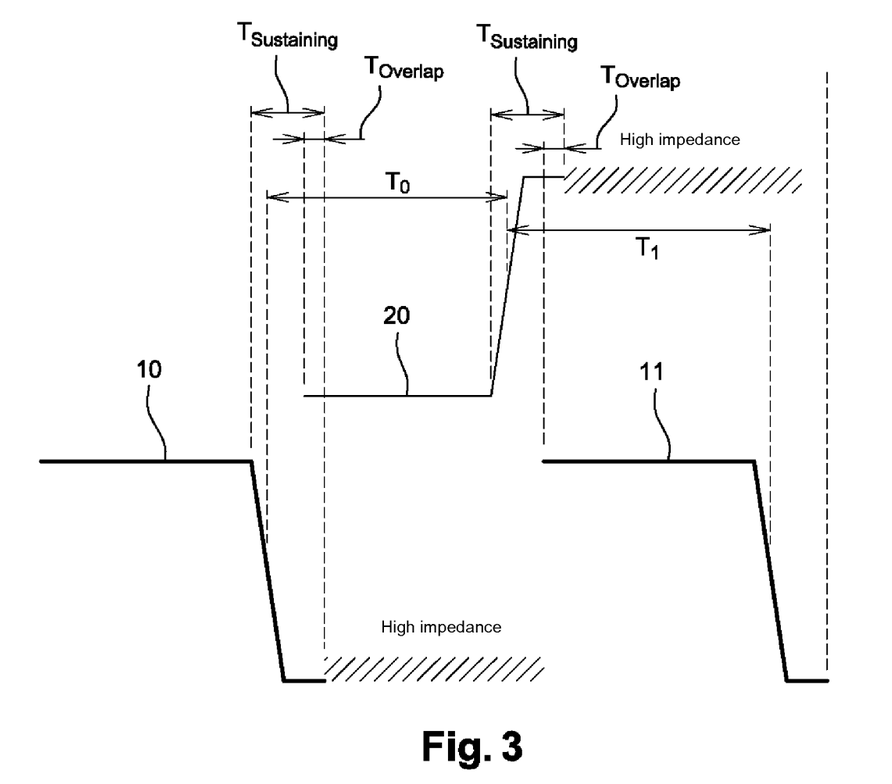
FIG. 3 details the timings that link the driving of the signals by the two transmission/reception devices.

FIG. 3 shows the details of the signals 10 and 11 produced by the device 1, between which the device switches to the high impedance status, and the signal 20 produced by the device 2. The transmission line is continuously driven by at least one of the two devices 1 and 2 in low impedance, which gives effective immunity from noise and an operating distance, providing the output impedance of the transmitters is equal to the impedance of the transmission line. The amplitude of the signals transmitted between the devices is defined by a convention specific to the system. That convention is indispensable to provide interoperability and achieve noise immunity margins that are appropriate for a given environment.

Figure 4:
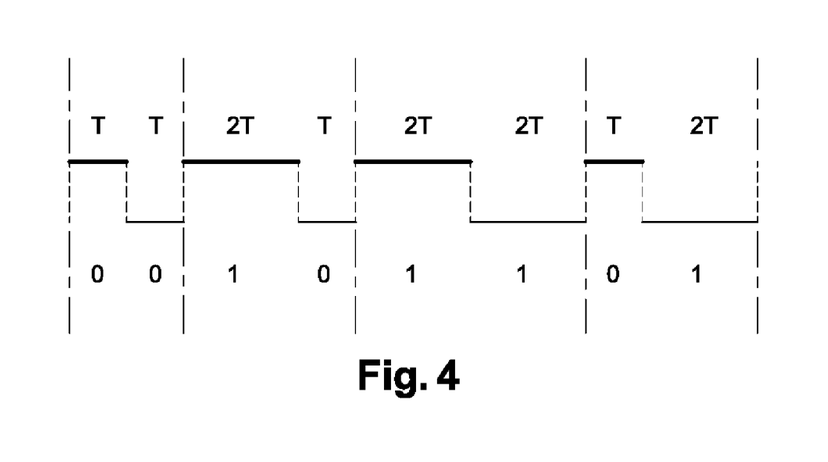
FIG. 4 is an illustration of PWM logical coding based on the pulse width.

As shown in FIG. 4, PWM coding is based on the pulse width: the logical value 0 has conventionally a time T and the logical value 1 has a time 2 T. Other conventions may be used (e.g. T and 3 T) if that choice leads to simplifications of the retrieval of the transmission clock required for decoding the information received by each transmission/reception device.

According to the mode of implementation, additional codes may be used in order to transmit a specific signal to a transmission/reception device. To illustrate that example, a convention that brings out the said signals may be:

T: logical value 0

2 T: logical value 1

4 T: reinitialising of the interface between the two devices 1 and 2.

In this mode of embodiment, the transmission of two bits generates a periodic signal, the duration of which is located between 2 T and 4 T, that is a binary average speed depending on the distribution of the logical value 0 and 1, located between ½ T and 1/T.

Each transmission/reception device 1 and 2 transmits its signal after the falling edge (or the rising edge) of the opposite transmission/reception device is detected. Each transmission/reception device can mask the signal received by it for a time α.T, where α is less than 1 less an error margin relating to the accuracy of the widths of the pulses generated by the transmitter.

Figure 5:
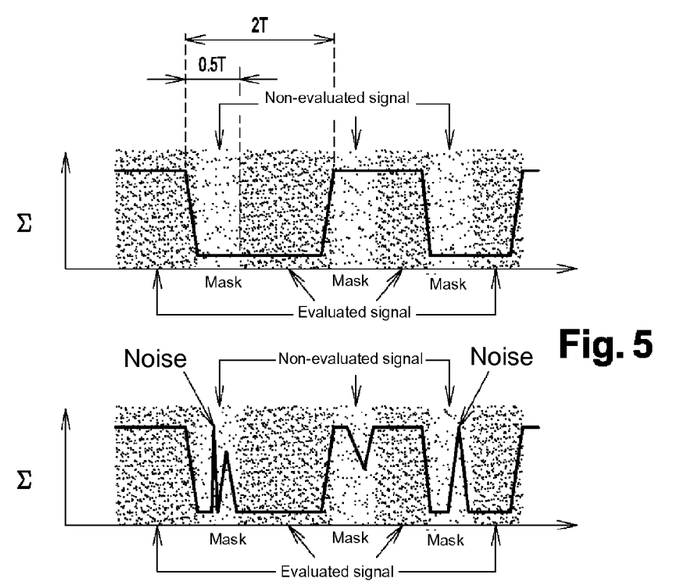
FIG. 5 illustrates two equivalent signals for the transmission/reception devices where one of the signals is affected by noise.

FIG. 5 illustrates two signals perceived upon reception, in a similar manner by the remote transmission/reception device when one of the signals is affected by noise (representation of the signal of the lower line). The mask applied to the signal received by a transmission/reception device makes it possible to hide any noise for 0.5 T (α=0.5).

Figure 6:
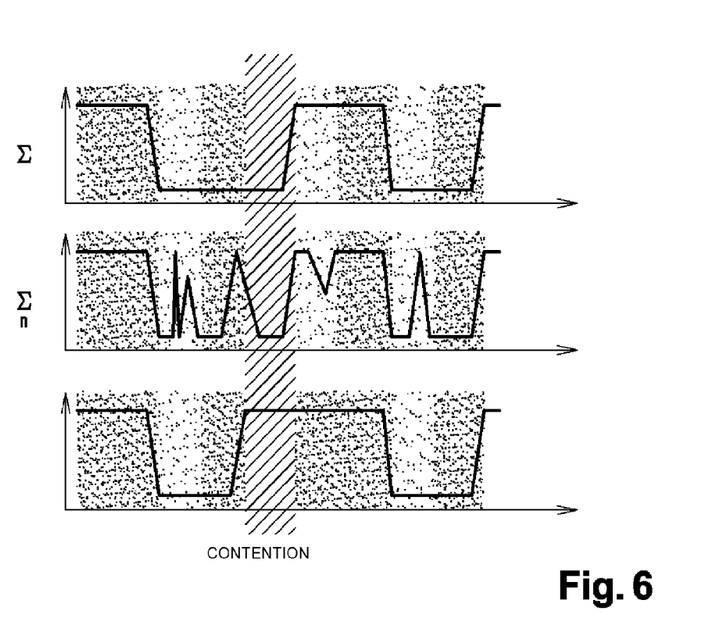
FIG. 6 illustrates the effects of noise on the transmission of a signal from one of the transmission/reception devices to the other.

As shown in FIG. 6, a noisy signal is interpreted by a transmission/reception device (in its reception function), which takes control of the line. The two transmission/reception devices 1 and 2 drive the line simultaneously in phase opposition. The two transmission/reception devices 1 and 2 are in contention. The status of the line is indefinite and can last up to (2−α)T. The circuitry of transmission/reception devices 1 and 2 must be able to support contention without damage. Line contention may generate an error in both transmission directions.

When the two transmission/reception devices 1 and 2 have no data to transmit, it is important to suspend the electrical activity on the line in order to save power. Similarly, if one of the transmission devices 1 or 2 wishes to reactivate the transmission line, an asynchronous reactivation procedure must be provided. The solution proposes two-state line management:

Line active: bidirectional transmission is possible, the two transmission/reception devices 1 and 2 exchange bits organised in packets.

Line suspended: no electrical activity, the two transmission/reception devices 1 and 2 can switch to power saving mode. For practical reasons, the line is on the electrical level 0 (0 Volt) when it is suspended.

Figure 7:
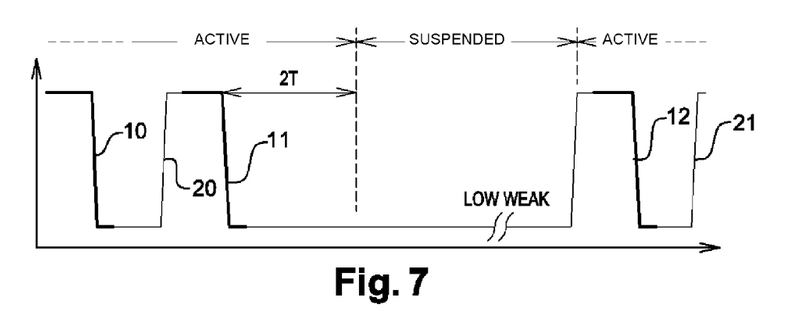
FIG. 7 is a time illustration of line switching from the active to suspended state and back.

FIG. 7 illustrates the procedure for switching the line from the active to the suspended state and vice versa.

The two transmission/reception devices 1 and 2 agree to an instant when the transmission/reception device 2 driving level "0" switches the line to the suspended status. To do that, the transmission/reception device 2 does not pull the line up to level 1. In order to give the transmission/reception device 1 the opportunity to switch the line to active mode, the transmission/reception device 2 keeps the line on the low weak level 0. The weak level 0 may be achieved by connecting the line to strong level 0 via a pulldown resistor or a source of current or an system called a bus keeper.

Each of the transmission/reception devices 1 and 2 can reactivate the line in the following way:

The transmission/reception device 2 must pull up the line to level 1 and then switch to high impedance.

The transmission/reception device 1 must pull up the line to level 1 and then complete its cycle according to the procedure described above.

The two transmission/reception devices 1 and 2 necessarily have different time bases, which is why a learning phase is required so that the said transmission/reception devices 1 and 2 may evaluate the respective time bases in order to decode the logical values received.

Figure 8:
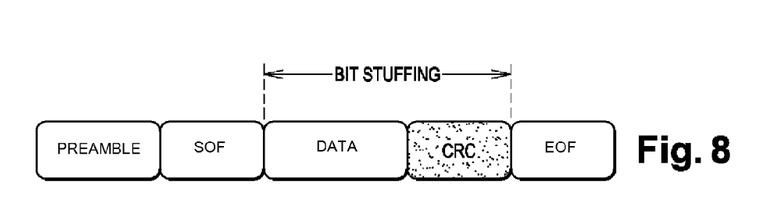
FIG. 8 shows a message format of the type proposed by the ETSI standard TS 102.613.

As shown in FIG. 8, to calibrate each transmission/reception device in its reception function, a preamble PREAMBLE is transmitted before each frame (SOF, DATA, CRC, EOF) emitted by the other transmission/reception device. The pattern of the preamble PREAMBLE is made up of a series of logical values 1 and 0 which facilitates the calibration of the remote transmission/reception device in its reception function. Preferentially, the transmission is bit-oriented, and so it is necessary to define a start-of-frame (SOF) flag and an end-of-frame (EOF) flag. Between the SOF and EOF flags, the data transmitted DATA are coded, for example using the so-called "bit stuffing" technique. The recommendation ETSI TS 102.613 precisely describes the structure of such a frame. The pattern of the preamble does not generate a bit-stuffing violation.

Figure 9:
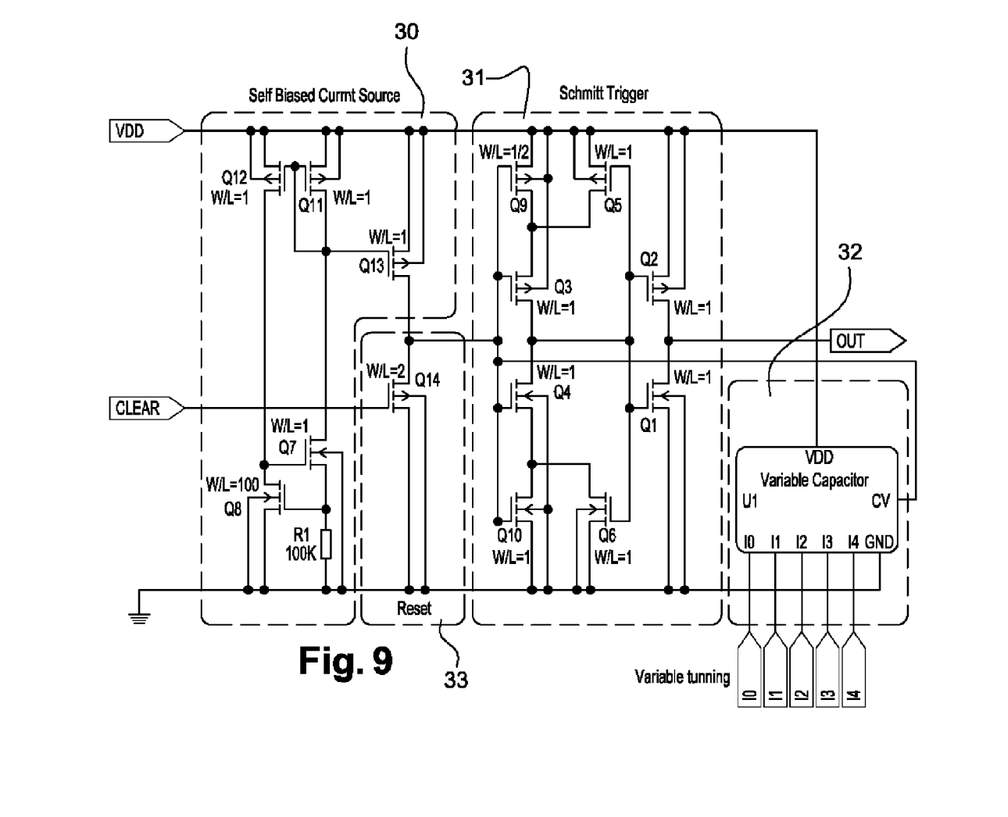
FIG. 9 illustrates a circuit included in each transmission/reception device for evaluating the time base (clock) from the remote transmission/reception device.

By reference to FIG. 9, the monostable trigger element illustrated in that Figure is triggered on the rising edge (master) or the falling edge (slave) of the transmitted signal. The principle of the monostable is the charging at a constant current of a digitally programmable capacitor 32. The said charge starts when the signal CLEAR is on level 0 (transistor Q4 not conducting). A Schmitt trigger 31 triggers at a determined level of voltage at the terminals of the programmable capacitor. The larger the programmed capacity, the more the output pulse from the monostable is delayed.

Figure 10:
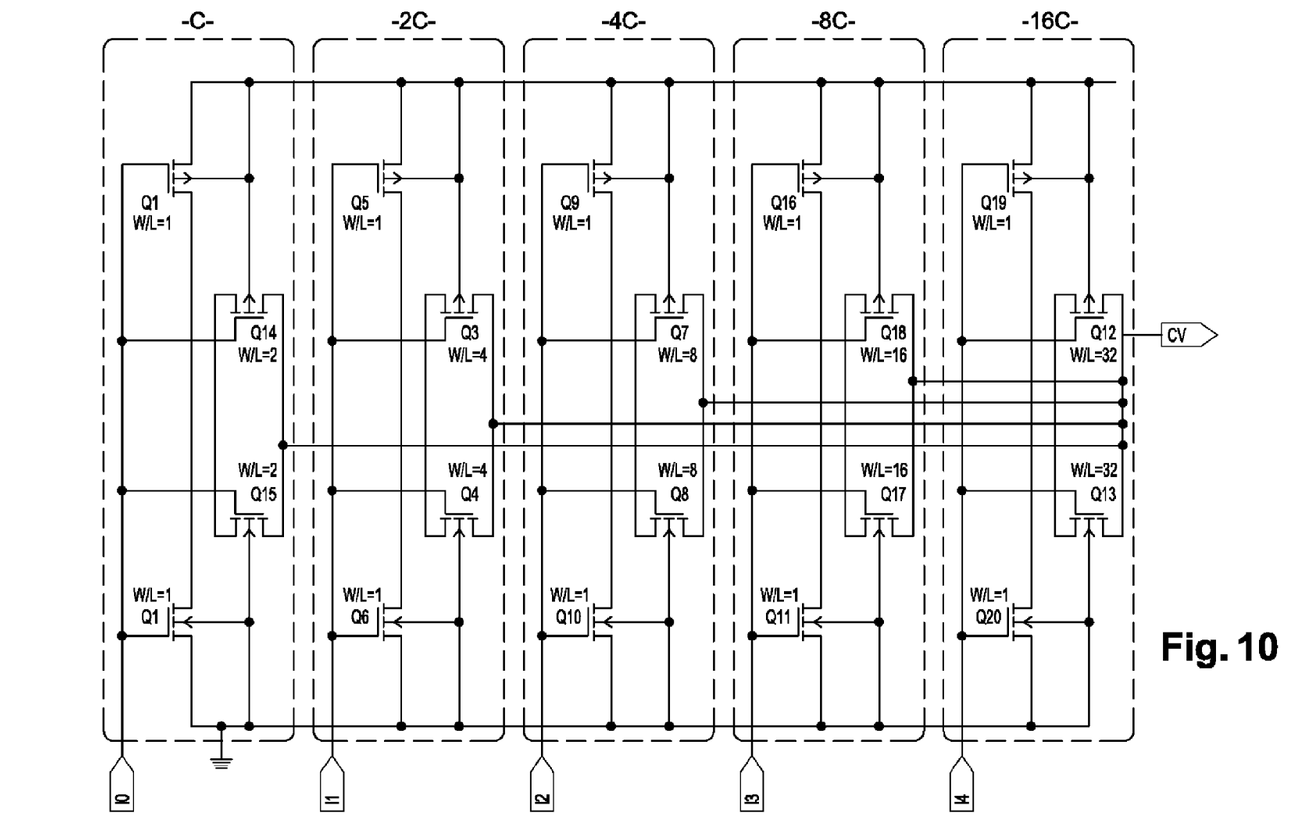
FIG. 10 is a schematic illustration of the circuit of a programmable capacitor.
Figure 11:
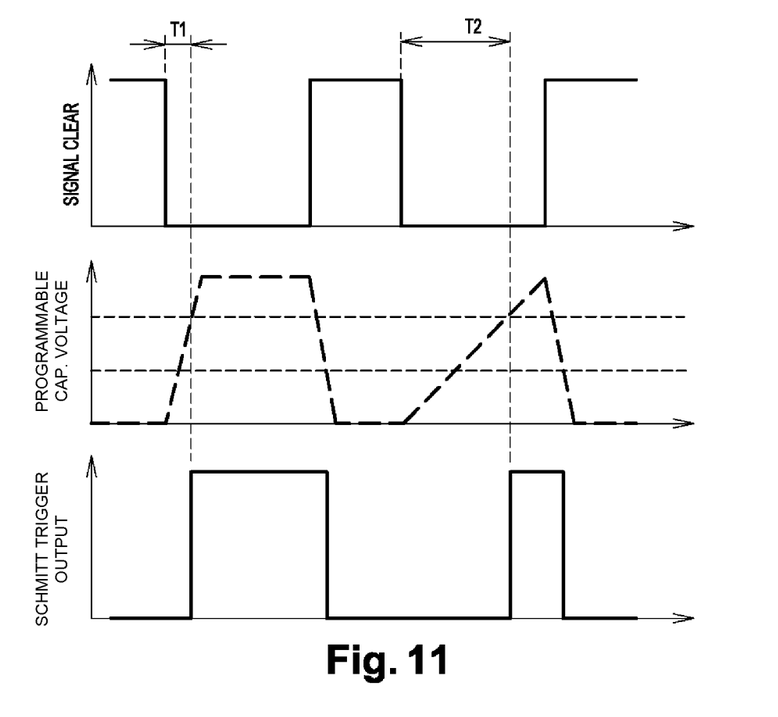
FIG. 11 shows the time representations of signals according to two programs (T1 and T2) of the programmable capacitor.

The principle of the programmable capacitor relies on the variation of the parasite capacity of the gate of a MOSFET transistor depending on its state (conducting or blocked). The said capacity is proportional to the surface of the gate and thus of the product W*L. FIG. 10 illustrates, as an example, a programmable capacitor 32 with five stages that is used to programme an equivalent capacity between C and 32C.

The precision of the delays generated by the monostable (FIG. 9) does not have to be great (<20%) because the error relating to the decoding of the signal bits received is not cumulative and each bit is self-synchronised. Synchronisation is only possible if the communication speed of the devices 1 and 2 is within a tolerance range that is sufficiently large to integrate the flexibility of the system and the tolerance of the components that make it up.

The tolerance is defined in relation to the median communication speed, that is 1/1.5T, where T is the coding of the logical value 0 (see FIG. 4).

The median communication speed and its tolerance are the subject of a convention (e.g. a standard) relating to the system.

Figure 12:
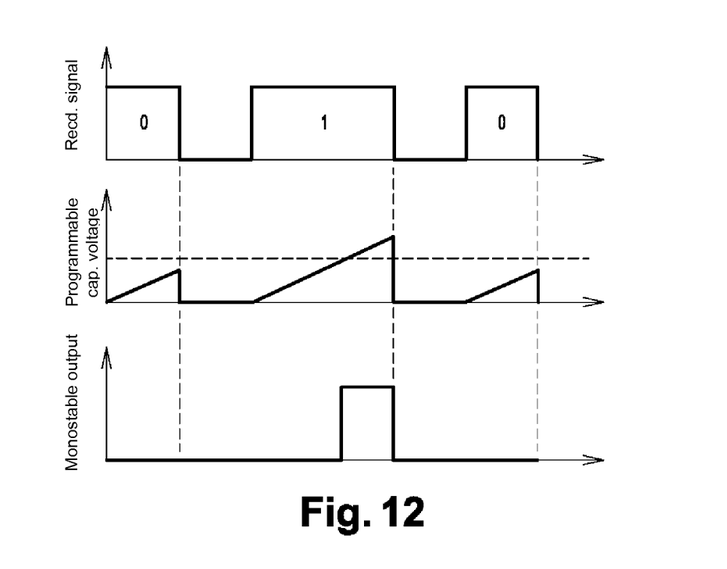
FIG. 12 illustrates the decoding of the signals received by a transmission/reception device thanks to a monostable trigger element set to 1.5 T.

FIG. 12 illustrates the output signal from the monostable of FIG. 9 as a function of two ways of programming (T1 and T2) of the programmable capacitor.

During the transmission of the synchronisation preamble PREAMBLE, the transmission/reception device 1 or 2 receiving the signal must evaluate the period T corresponding with the transmission of an analogue 0. It is thus of use to send logical 0s during the said synchronisation preamble.

The synchronisation principle relies on successive dichotomical approximation. Synchronisation is divided into 2N stages where N is the number of stages of the programmable capacitor 32 (shown according to an embodiment in FIG. 10), expressed in N bits between 1 and $2^N-1$, the transmission/reception device being non synchronised. Intrinsically, the programming of the programmable capacitor represents a delay D(Z) where Z is located between 1 and $2^N-1$.

The delay is programmed with the value $2^{N-1}$.

For bits I from N to 0, the following stages are implemented:

stand by for the end of the received bit. Store in the bit (I) of Z the output value from the monostable, and stand by for the end of the received bit. Store in the bit (I) of Z the output value from the monostable. Store 1 in the bit (I−1), and so on.

After every two bits, a bit of the delay to programme is evaluated.

According to one alternative, the solution based on an analogue monostable may be replaced by its digital equivalent. The constraint of a digital solution is a very high sampling frequency which may be incompatible with low power consumption requirements.

The synchronisation is deterministic. The number of synchronisation bits required is twice the number of bits for programming the delay generated by the monostable. However, that number of bits may be reduced if the monostable delivers two signals corresponding to the overrun of a programmed level X and X/2.

The value Z after synchronisation is read and increased by 50% in order to enable decoding.

The two transmission/reception devices 1 and 2 emit on a line that is not necessarily adapted (no Z=∞ termination), so the emitted signal is totally reflected.

Figure 13:
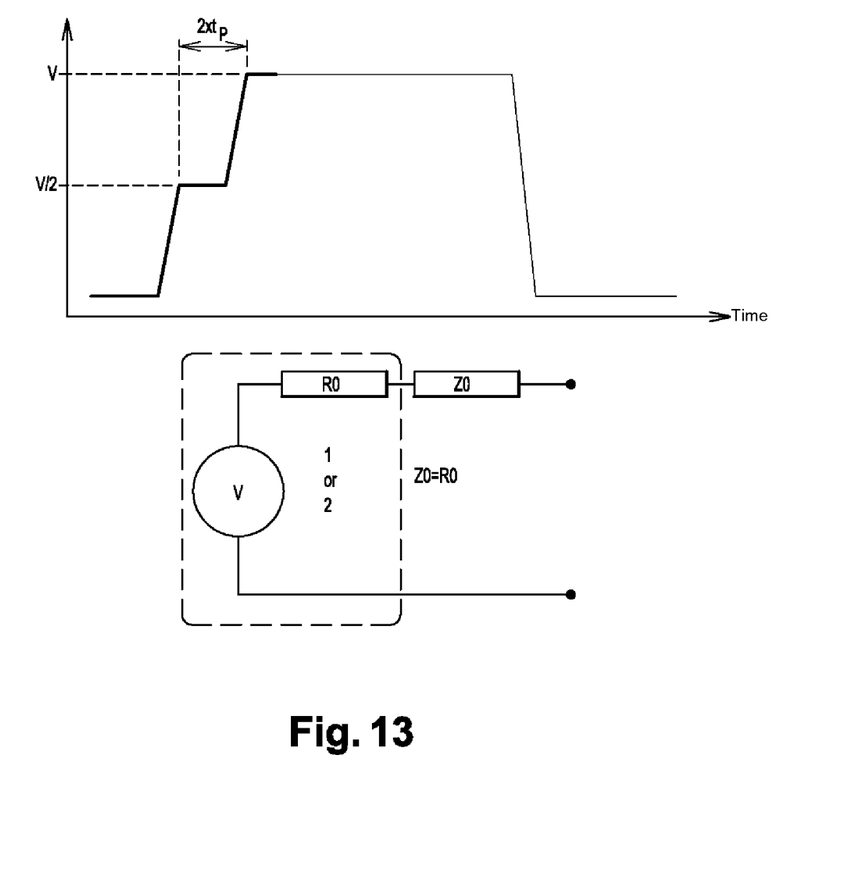
FIG. 13 illustrates the waveform at the end of the transmission line near the transmission/reception device that drives the low level.

FIG. 13 illustrates the waveform at the end of the transmission line near the transmission/reception device that drives the low level.

Over short transmission distances, reflection is not a problem, but if the propagation time is comparable to the time for transmitting one bit (bit rate), then the line must be adapted.

The solution is fully compatible with differential transmission (e.g. LVDS) and takes advantage of the benefits of improved immunity to noise.

In a specific mode of embodiment, more than two emission/reception devices are connected to the same transmission line.

A simple solution with no bus contention consists firstly in connecting a transmitter of the A type with several transmitters of the B type or inversely connecting a transmitter of the B type with several transmitters of the A type, and secondly in operating a collision-free resolution protocol (which is thus contention free).

The operating of a collision-free resolution protocol may include the following steps:

1. Two of the emission/reception devices listen to the line and maintain their output in high impedance.

2. Another emission/reception device, called an emitting device, emits a frame containing the identifier of the transmitter of the type B allowed to exchange a frame with it.

3. One of the two emission/reception devices listening to the line that has decoded its identifier by listening to the bus exchanges a frame with the transmitter 1. The emitting emission/reception device exchanges a frame with the device assigned in this way. Intelligent management may advantageously be put in place in order to distribute access to the bus by the emission/reception devices depending on their activities and therefore their needs. If the two listening emission/reception devices cannot initiate exchange within a determined type, step 1 starts again.

4. Return to step 1.

In this way, the benefits of the solution described above appear clearly:

- The solution is totally symmetrical and the two transmission/reception devices have merely to select the level they are to drive,
- It operates on an active wire, but can also operate on a differential pair LVDS, RS485). This characteristic can resolve the requirements relating to a maximum number of contacts (connector).
- It is immune to noise by operating in low impedance and offering filtering that limits the impact of noise and can reach high binary speeds by occupying a limited spectrum (in the example of the patent less than twice the frequency of the data to transmit).

The invention claimed is:

1. A method using a half-duplex mode for the transmission of a data signal from a first transmission/reception device to a second transmission/reception device called the remote device, including a logical coding step during which at least two distinct transmission times (T, 2T) are associated with two respective statuses ("0" and "1") of the data signal to transmit, comprising the operating the first device to generate a signal having, for the transmission of a signal status, approximately exclusively a plateau at a first voltage level for the time defined as the transmission time (T, 2T) associated with the status ("0" and "1") to transmit and a falling edge, to the exclusion of any rising edge; and operating the second device to transmit a status of the data signal from the second device to the first device by generating a signal having approximately exclusively a plateau at a second voltage level and a rising edge, to the exclusion of any falling edge.

2. A transmission/reception device, comprising:
a logical coding circuit for associating at least two distinct transmission times (T, 2T) with at least two respective statuses of a data signal to transmit,
a circuit that detects the falling edge generated by a remote transmission/reception device,
a circuit for generating, in response to the detection of the falling edge generated by a remote transmission/reception device, for a status of the data signal, approximately exclusively a plateau on a first voltage level for approximately the time defined as the transmission time (T, 2T) associated with the status ("0", "1") to transmit and a rising edge, to the exclusion of any falling edge.

3. A transmission/reception device, comprising:
a logical coding circuit for associating at least two distinct transmission times (T, 2T) with at least two respective statuses of the data signal S to transmit,
a circuit for the detection of a rising edge generated by a remote transmission/reception device,
a circuit for generating, in response to the detection of the said rising edge generated by a remote transmission/reception device, for a status of the data signal to transmit, approximately exclusively a plateau at a second voltage level approximately for the time defined by the transmission time (T, 2T) associated with the status ("0", "1") to transmit and a falling edge, to the exclusion of any rising edge.

* * * * *